(12) United States Patent
Phan et al.

(10) Patent No.: US 11,003,155 B2
(45) Date of Patent: May 11, 2021

(54) CALIBRATION APPARATUSES AND METHODS FOR FOOD PROCESSING MACHINES

(71) Applicant: MP Equipment, LLC, Gainesville, GA (US)

(72) Inventors: Tuan Anh Phan, Norcross, GA (US); Ernest Merrill, Atlanta, GA (US); Matt Jones, Winder, GA (US); James S. Tomlin, Gainesville, GA (US)

(73) Assignee: MP Equipment, LLC, Gainesville, GA (US)

( * ) Notice: Subject to any disclaimer, the term of this patent is extended or adjusted under 35 U.S.C. 154(b) by 115 days.

(21) Appl. No.: 16/222,172

(22) Filed: Dec. 17, 2018

(65) Prior Publication Data

US 2019/0187662 A1 Jun. 20, 2019

Related U.S. Application Data

(60) Provisional application No. 62/607,174, filed on Dec. 18, 2017.

(51) Int. Cl.
*G06F 19/00* (2018.01)
*G05B 19/402* (2006.01)
*A47J 43/07* (2006.01)

(52) U.S. Cl.
CPC ............ *G05B 19/402* (2013.01); *A47J 43/07* (2013.01); *G05B 2219/31269* (2013.01); *G05B 2219/37087* (2013.01)

(58) Field of Classification Search
CPC ...... B26D 2210/02; B26D 5/007; B26D 5/32; B26D 5/34; B26D 7/0616; B26D 7/0625;
(Continued)

(56) References Cited

U.S. PATENT DOCUMENTS

| 5,585,605 A | 12/1996 | Williams et al. |
| 5,868,056 A | 2/1999 | Pfarr et al. |

(Continued)

OTHER PUBLICATIONS

MP Equipment, Jet Series Operations Manual, Sep. 2015, MP Equipment, LLC, Gainseville, GA, 211 pages (Year: 2015).*
(Continued)

*Primary Examiner* — Zhipeng Wang
(74) *Attorney, Agent, or Firm* — Andrus Intellectual Property Law, LLP

(57) ABSTRACT

A calibration system for a food processing machine has a conveyor for conveying a workpiece, scanning system for scanning the workpiece and creating a digital image of the workpiece, and a cutting device downstream from the scanning system for cutting the workpiece. A calibration object is conveyed through the food processing machine by the conveyor and scanned. A controller, with a memory, is in communication with the cutting device and the conveyor such that the controller can track position of the cutting device as the cutting device is moved into alignment with the calibration object and store calibration values on the memory corresponding to the movement of the cutting device into alignment with the calibration object. The controller is configured to calibrate movement of the cutting device relative to the workpiece based on the digital image of the workpiece and the calibration values to thereafter accurately cut the workpiece.

21 Claims, 12 Drawing Sheets

(58) Field of Classification Search
CPC ....... B26D 7/0658; B26F 3/004; G01B 11/06; G01B 15/02; G01G 19/00; G12B 13/00; A47J 43/07; G05B 19/402; G05B 2219/31269; G05B 2219/37087
See application file for complete search history.

(56) References Cited

U.S. PATENT DOCUMENTS

| | | |
|---|---|---|
| 8,839,949 B2 | 9/2014 | Vogeley, Jr. |
| 2017/0135357 A1* | 5/2017 | Finnsson .............. B26D 7/0625 |
| 2017/0210023 A1* | 7/2017 | Hocker ................. G01G 19/00 |
| 2017/0217044 A1 | 8/2017 | Blaine |
| 2018/0158537 A1* | 6/2018 | Blaine .................... G12B 13/00 |

OTHER PUBLICATIONS

MP Equipment, Jet Series Operations Manual, Sep. 2015, MP Equipment, LLC, Gainseville, GA, 211 pages.

\* cited by examiner

CALIBRATION APPARATUSES AND METHODS FOR FOOD PROCESSING MACHINES

CROSS-REFERENCE TO RELATED APPLICATION

The present application is based on and claims priority to U.S. Provisional Patent Application No. 62/607,174 filed Dec. 18, 2017, the disclosure of which is incorporated herein by reference.

FIELD

The present disclosure relates to processing machines for processing products, in particular, food processing machines for processing food products into smaller pieces.

BACKGROUND

The following U.S. patent and U.S. Patent Application Publication are incorporated herein by reference in entirety.

U.S. Patent Application Publication No. 2017/0217044 discloses a portioning system that includes a scanner for scanning work products being carried on the conveyor. A cutter system includes an array or manifold cutter and single cutter for cutting the work products into desired sized end pieces. The cutter assemblies and are carried on respective carriages and to move the cutters as required along predetermined cutting paths as controlled by a control system.

U.S. Pat. No. 5,868,056 discloses an actuator apparatus with a transverse support structure for guiding a transverse carriage therealong. The carriage is powered by a remotely located rotational actuator through an endless belt secured to the carriage. A second carriage moves along a longitudinal support structure cantilevered transversely from the carriage. The second carriage is powered by a remotely located second rotational actuator acting through a second endless belt. A working tool is mounted on the second carriage for high-speed bi-directional movement.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a calibration system for a food processing machine has a conveyor for conveying a workpiece, a scanning system for scanning the workpiece and creating a digital image of the workpiece, and a cutting device downstream from the scanning system for cutting the workpiece. A calibration object is conveyed through the food processing machine by the conveyor and scanned by the scanning system. A controller, with a memory, is in communication with the cutting device and the conveyor such that the controller can track position or movement of the cutting device as the cutting device is moved into alignment with the calibration object and further can store calibration values on the memory corresponding to the movement of the cutting device into alignment with the calibration object. The controller is configured to calibrate movement of the cutting device relative to the workpiece based on the digital image of the workpiece and the calibration values to thereafter accurately cut the workpiece.

In certain examples, a method for calibrating a food processing machine having a conveyor for conveying a workpiece, a scanning system for scanning the workpiece and creating a digital image of the workpiece, and a cutting device downstream from the scanning system for cutting the workpiece. The method includes conveying a calibration object to the scanning system; scanning the calibration object to create a digital image of the calibration object, and further conveying the calibration object to the cutting device. The method further includes moving the cutting device into alignment with the calibration object, tracking, with a controller having a memory, position or movement of the cutting device into alignment with the cutting device, and storing, onto the memory, calibration values corresponding to movement of the cutting device into alignment with the calibration object. The method further includes calibrating, with the controller, operational movement of the cutting device relative to the workpiece based on the digital image of the workpiece and the calibration values stored on the memory to thereafter accurately cut the workpiece.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

Food processing machines are used to process workpieces, such as food products, into smaller pieces or portions. The workpieces are conveyed through the machine on a conveyor, scanned to ascertain their size and shape, and analyzed to determine how to best cut and portion the workpieces. The workpieces are then processed, e.g. cut, by cutting actuators or devices, such as high-speed water jets, that move transversely and longitudinally relative to the conveyor without stopping the conveyor (e.g. as the workpieces are continuously conveyed through the machine, each workpiece is scanned, analyzed, and cut without stopping the conveyor). Reference is made to above-incorporated U.S. Pat. No. 5,868,056 and U.S. Patent Application Publication No. 2017/0217044 for examples of conventional food processing machines and components thereof, including conventional cutting devices.

The inventors of the present disclosure have endeavored to improve food processing machines and develop apparatuses, systems, and methods for calibrating food processing machines that process workpieces into smaller pieces. The inventors have recognized that conventional systems and methods for calibrating food processing machines often require the food processing machines to be taken out of service for extended periods of time as technicians calibrate the machine. As such, the machine is unable to process workpieces and the overall efficiency and output from the machine decreases. Accordingly, the present inventors have developed the below-disclosed apparatuses, systems, and methods for calibrating food processing machines.

Figure 1:
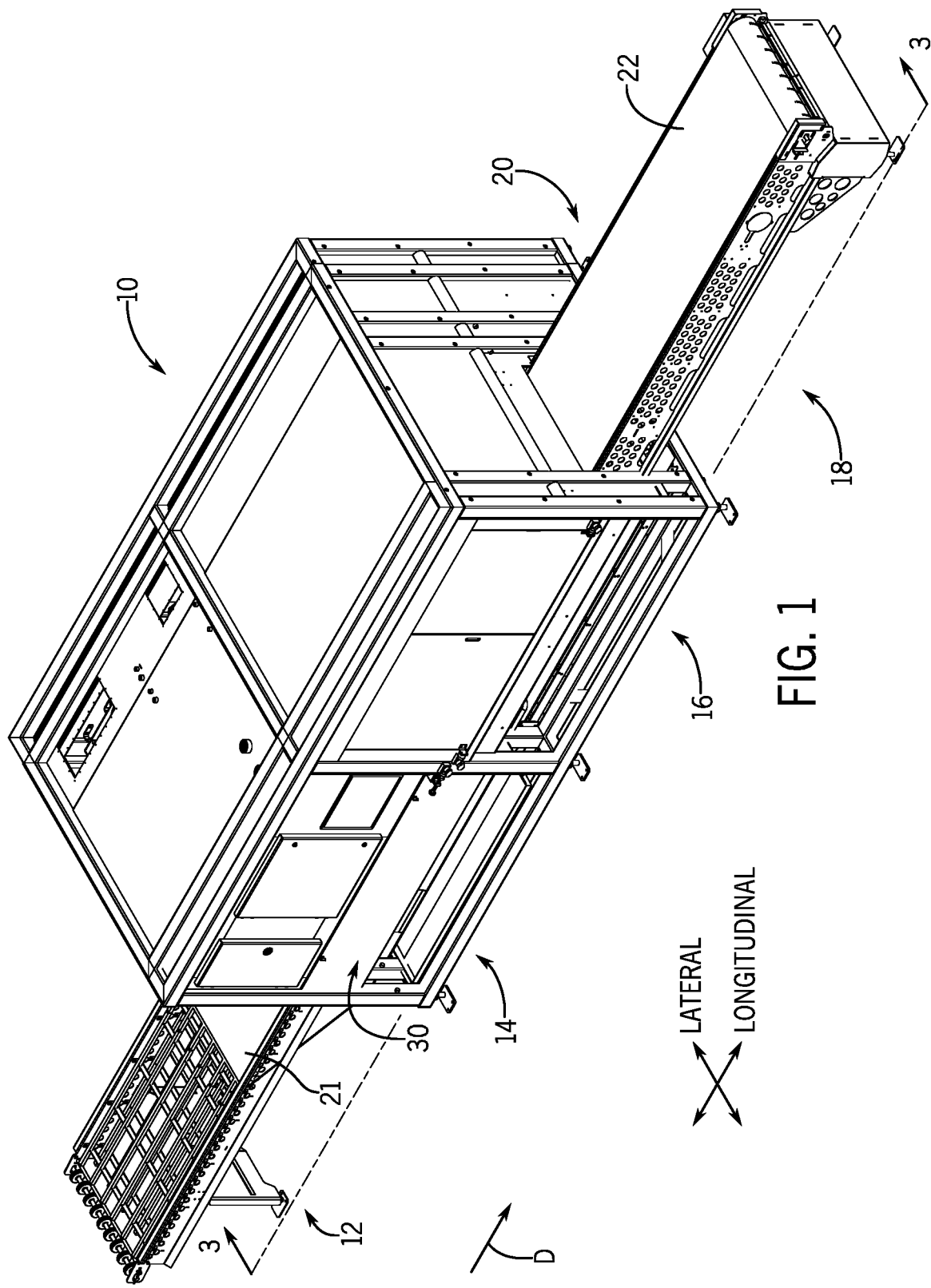
FIG. 1 is a perspective view of an example food processing machine.
Figure 2:
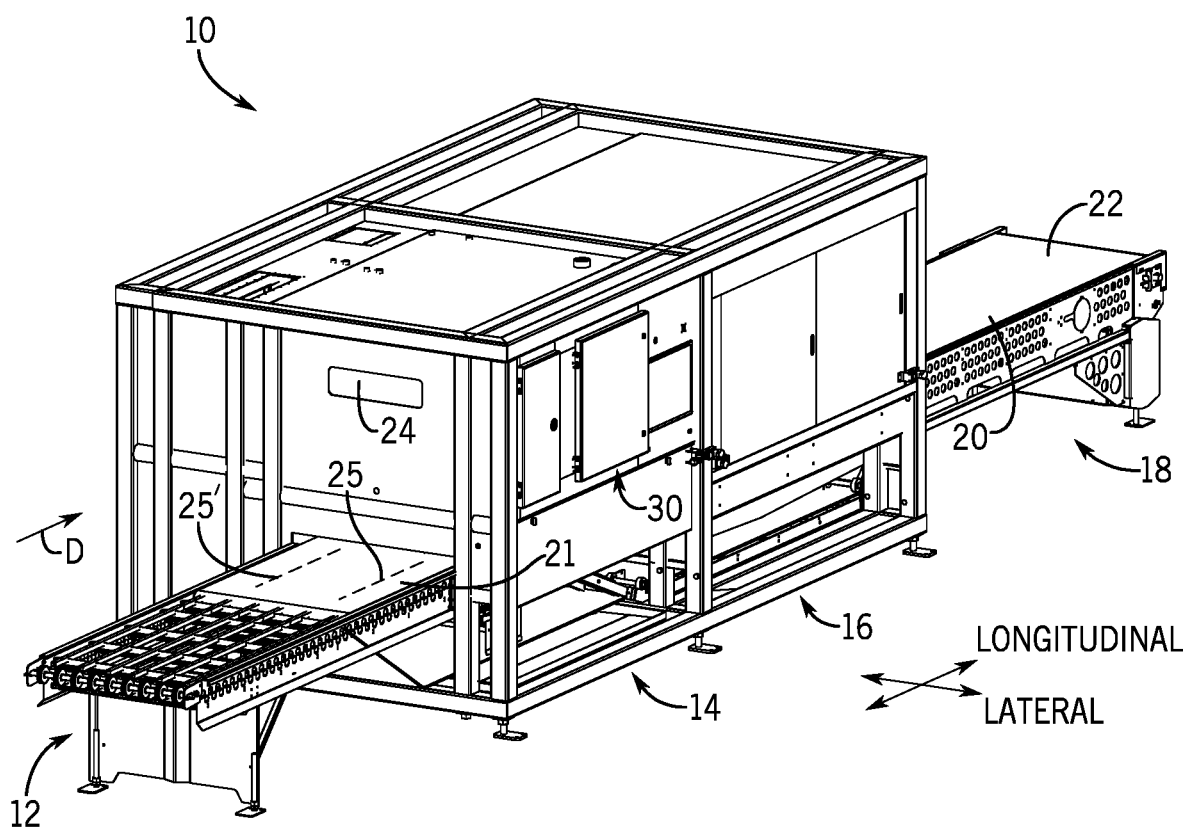
FIG. 2 is another perspective view of the food processing machine of FIG. 1.
Figure 3:
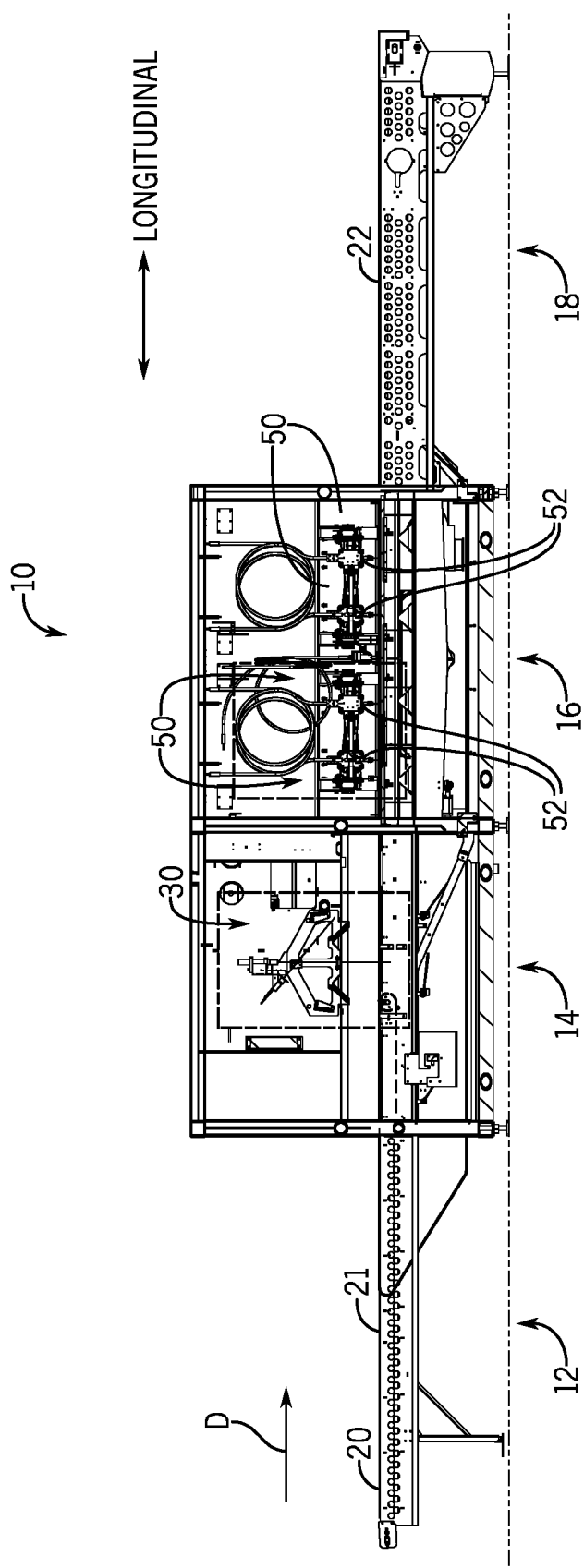
FIG. 3 is a cross-sectional view of the food processing machine of FIG. 1 along line 3-3 on FIG. 1.

FIGS. 1-3 depict an example food processing machine 10 according to the present disclosure. The food processing machine 10 has a conveyor 20 (described further herein) which continuously conveys workpieces through of the food processing machine 10. Specifically, the workpieces are conveyed downstream from an upstream infeed section 12 where workpieces, e.g. food products, are loaded onto a conveyor 20 to a scanning section 14 where the workpieces are scanned by a scanning system 30. The workpieces are then further conveyed downstream to a cutting section 16 where the workpieces are cut into smaller pieces by one or more cutting assemblies 50 with cutting devices 52 (FIG. 3). The smaller pieces are further conveyed downstream to a downstream outfeed section 18 where the smaller pieces are manually or automatically loaded into another processing machine or packaging containers for shipment (not shown).

The conveyor 20 includes a first belt 21 that extends along the infeed section 12 and at least partially along the scanning section 14 and a second belt 22 that extends at least partially along the scanning section 14, along the cutting section 16, and along the outfeed section 18. During operation, the workpieces conveyed downstream by the first belt 21 are smoothly transferred or dispensed onto the second belt 22 (see also FIG. 5). The belts 21, 22 are continuous belts that continuously circulate at the same rate of speed such that the workpieces smoothly move from the first belt 21 to the second belt 22. In certain examples, the first belt 21 is made of an opaque plastic or cloth material, and the second belt 22 is made of a metal link (e.g. a metal mesh belt).

Referring specifically to FIG. 2, the infeed section 12 and the first belt 21 of the conveyor 20 are shown in greater detail (note the first belt 21 is partially shown so as to expose the framework of the conveyor 20). Workpieces are manually loaded onto the first belt 21 and aligned with infeed laser lines 25 that project onto the first belt 21 from laser light emitters (not shown) positioned behind window 24. The infeed laser lines 25 extend parallel to the direction of travel of first belt 21 (see arrow D which depicts the direction of travel of the belts 21, 22). The infeed laser lines 25 are visual cues for directing workers to properly align workpieces on the first belt 21. In one example, the worker aligns a component of the workpieces, such as the keel of a piece of chicken, with the infeed laser lines 25. The number of infeed laser lines 25 can vary, and in the example depicted in FIG. 2, two parallel infeed laser lines 25. 25' are depicted. The laser light emitters can be adjusted if needed, and in one example can be adjusted such that the infeed laser lines 25 are parallel to the lateral edges of the first belt 21.

Figure 4:
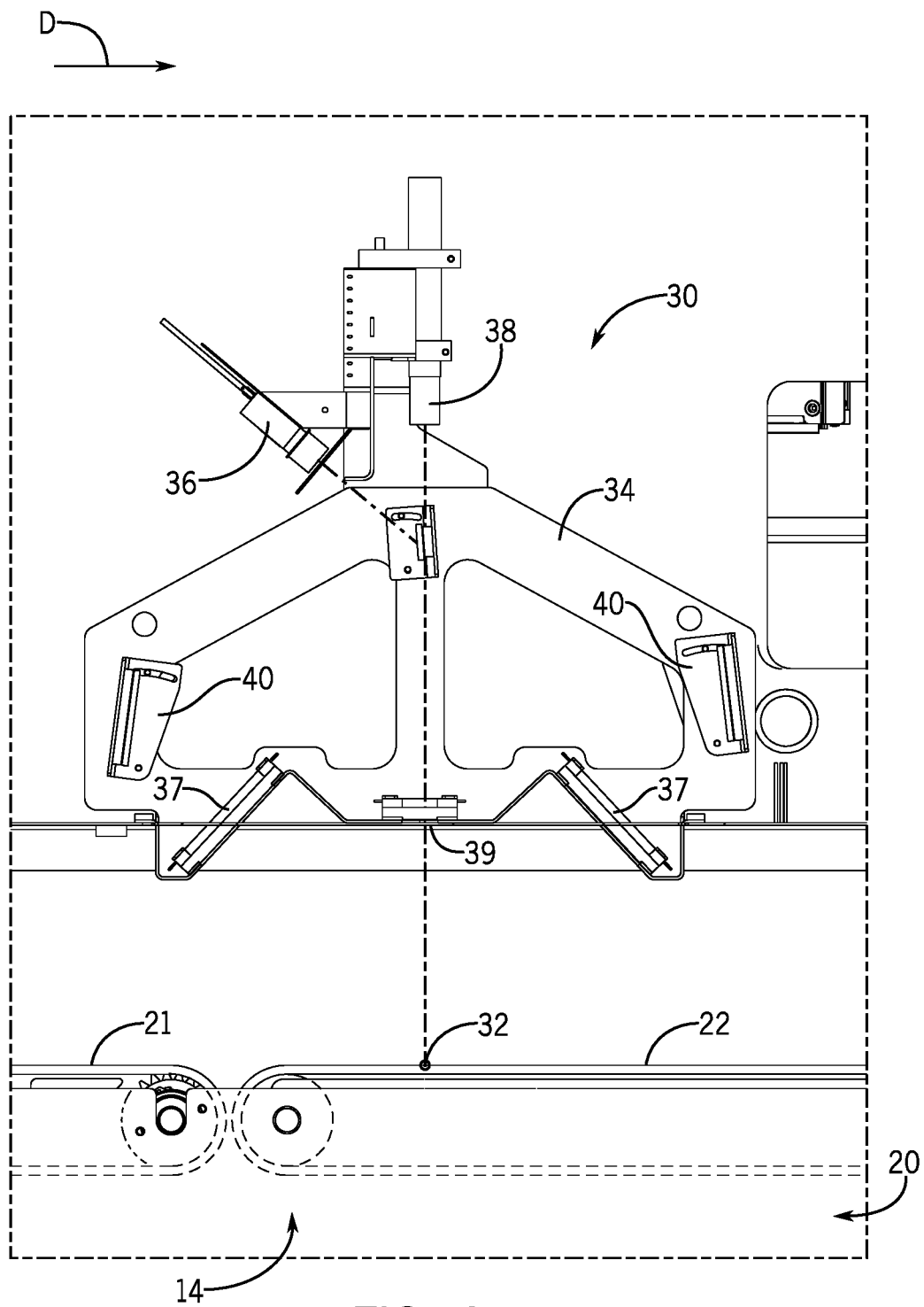
FIG. 4 is a side view of a scanning system.
Figure 5:
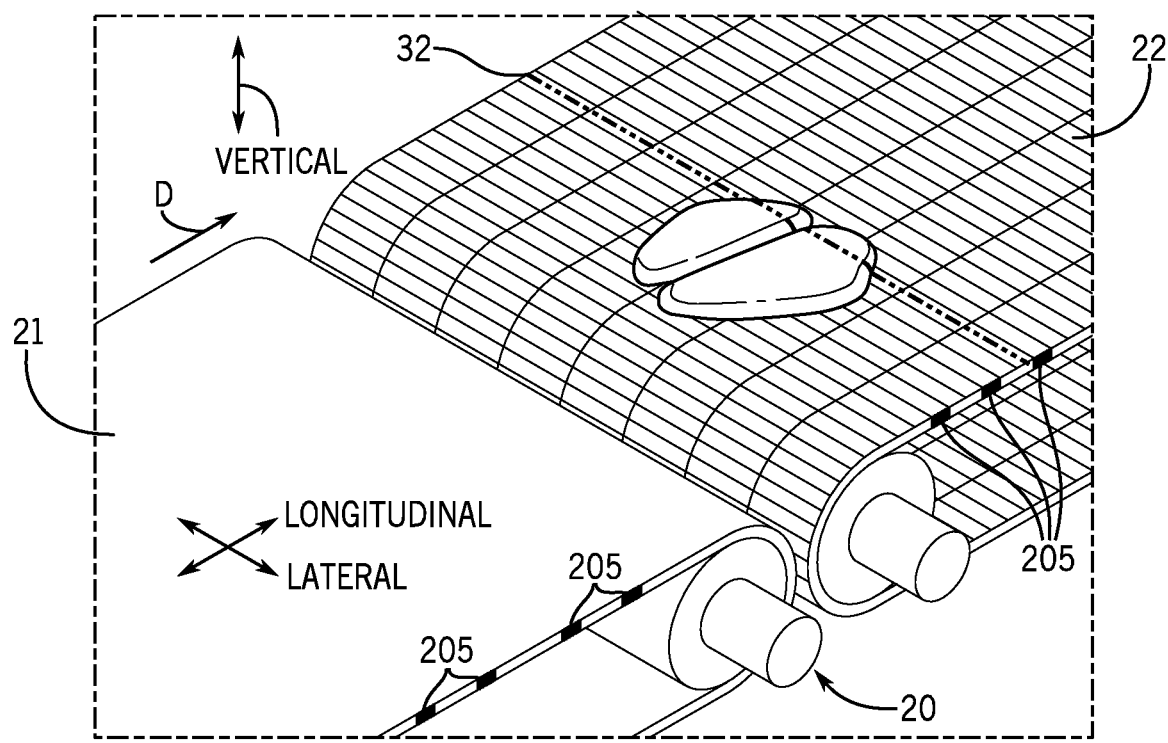
FIG. 5 is a perspective view of a conveyor and the scanning system.

Referring now to FIG. 4, an enlarged side view of the scanning section 14 and the scanning system 30 is depicted. The scanning system 30 includes a frame 34 on which a detector, such a camera 36, and a scanner laser emitter 38 are mounted. The scanner laser emitter 38 that emits laser light through the laser window 39 and onto the second belt 22 and the workpiece (see also FIG. 5). The scanning laser line 32 is emitted onto either the first belt 21 or the second belt 22 and the workpiece and is transverse or perpendicular to the direction of travel (see FIG. 5 arrow D) of the belts 21, 22 and the workpiece through the machine 10. (note that FIGS. 4 and 5 depict the scanning laser line 32 emitted onto the second belt 22). As the workpieces are conveyed into and through the scanning section 14, a scanning system 30 scans the workpieces and sends signals to a computer controller 200 (see FIG. 10) which creates a digital image of the workpiece based on the signals received (described further herein). Based on the digital image, which may be a digital scan, photograph, model, or the like, of the workpiece, attributes, e.g. size, length, width, and thickness, of the workpiece are determined by the machine 10 and computer controller 200 and further analyzed to determine how to best cut and portion the workpiece further downstream at the cutting section 16. In certain examples, the digital image of the workpiece is a three-dimensional (3D) model of the workpiece. The scanning laser line 32 is detected by the camera 36 which is oriented at an angle relative to the first belt 21 and second belt 22 and is for detecting or sensing the scanning laser line 32. In certain examples, the camera 36 is orientated at a 40-degree angle relative to the first belt 21 and second belt 22. The present inventors have contemplated that the detector 36 may be any suitable device capable of detecting or imaging the workpiece on the conveyor.

Figure 10:
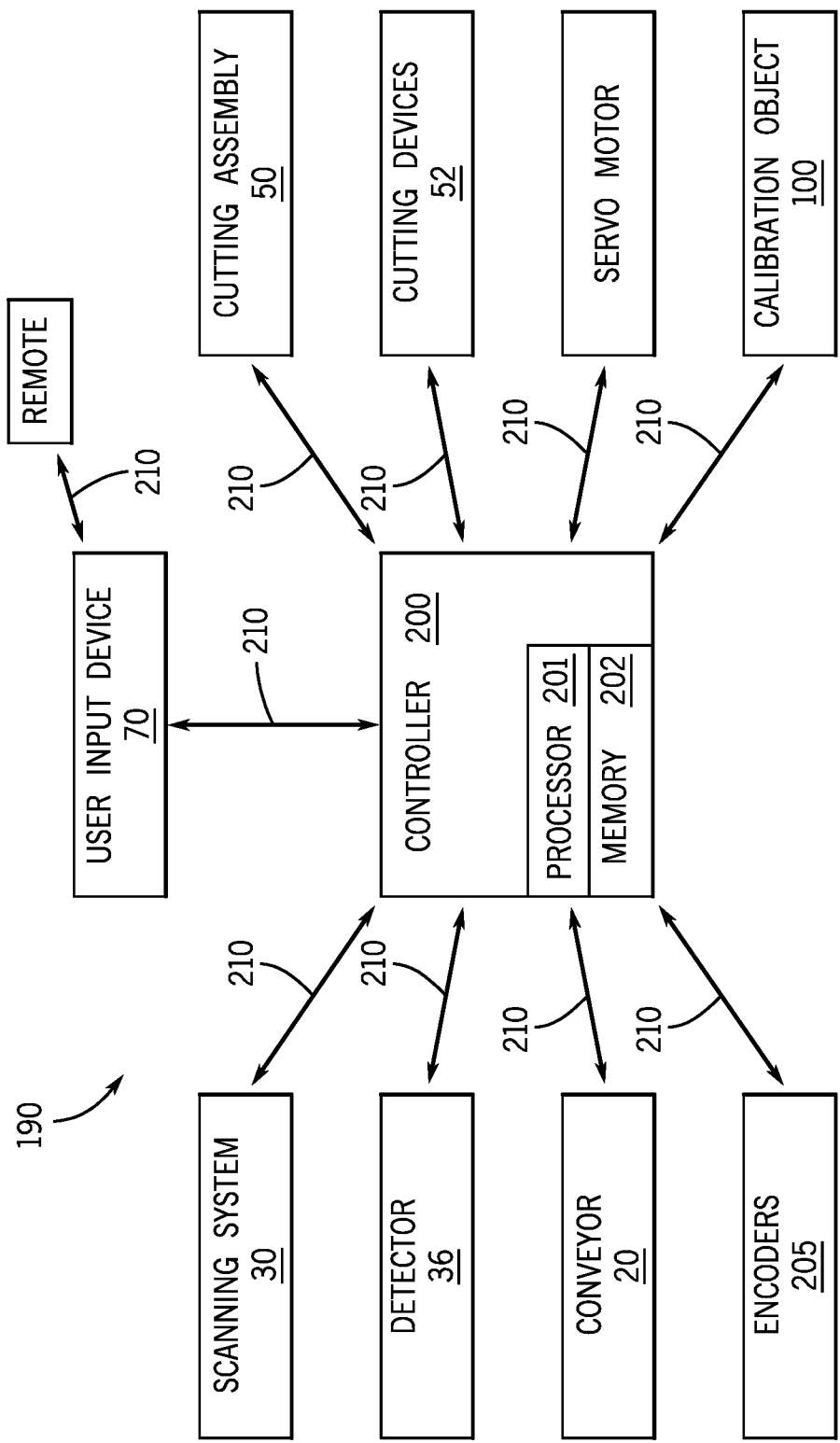
FIG. 10 a schematic diagram of an example computing system of the food processing machine.
Figure 11:
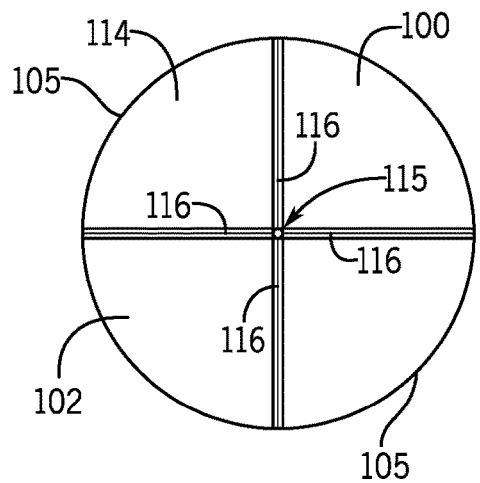
FIG. 11 is a top view of an example calibration object.
Figure 14:
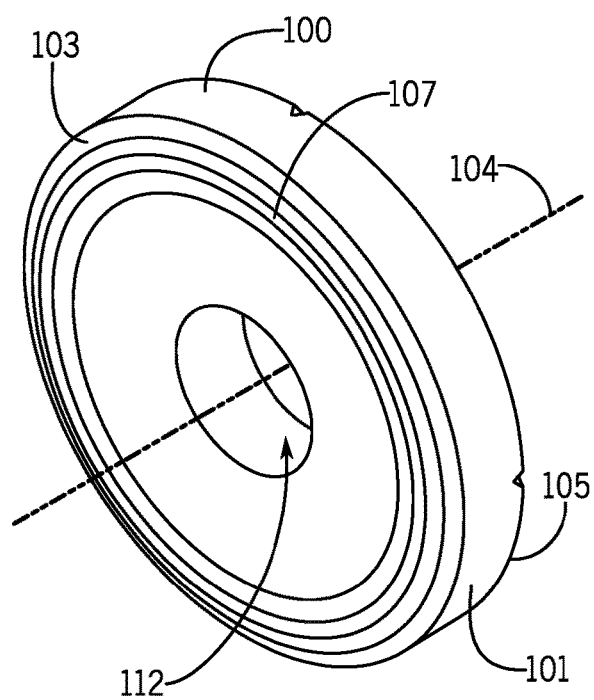
FIG. 14 is a perspective view of the calibration object of FIG. 11.
Figure 12:
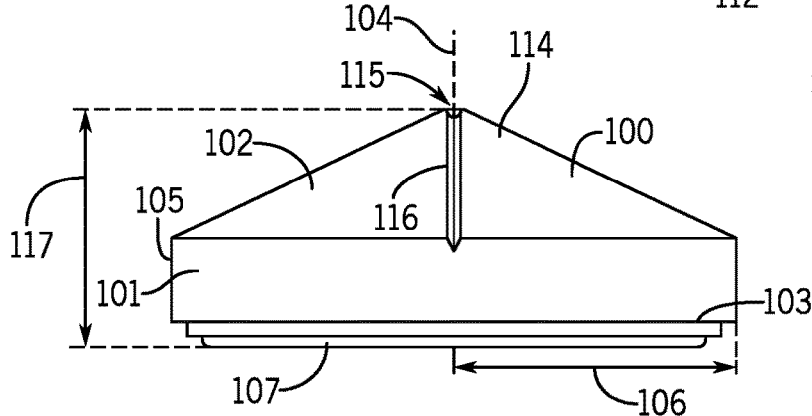
FIG. 12 is a side view of the calibration object of FIG. 11.
Figure 13:
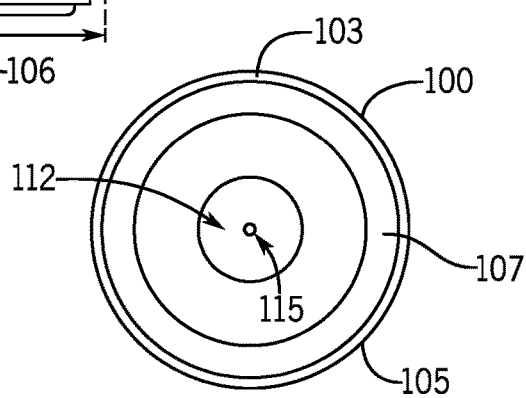
FIG. 13 is a bottom view of the calibration object of FIG. 11.

FIG. 5 depicts an example workpiece being scanned by the scanning system 30. In this example, the camera 36 (FIG. 4) senses the scanning laser line 32 through camera windows 37 (FIG. 4) as the workpiece is conveyed through the scanning section 14. The size and shape of the workpiece cause the scanning laser line 32 to vertically elevate above the second belt 22 and along the workpiece as the workpiece is conveyed past the scanning laser line 32. Put another way, the scanning laser line 32 "moves" along the exterior surface of the workpiece as the workpiece is conveyed. As such, the camera 36 detects the vertical displacement of the scanning laser line 32 on the workpiece relative to the scanning laser line 32 on the second belt 22 when the workpiece is not present and sends signals or images to the computer controller 200 (FIG. 10). For example, each frame image taken by the camera 36 correlates to a cross-section of the food product (e.g. a 1.0-millimeter cross-section of the workpiece) which are processed or stitched together to create the digital image of the workpiece. In addition, a series of mirrors 40 (see FIG. 4) may also reflect images of the scanning laser line 32 from different angles to the camera 36 such that different images or views of the workpiece are captured by the camera 36 (e.g. the camera 36 detects a front view of the workpiece in a direction from downstream to upstream, opposite arrow D; the camera 36 detects a back view of the workpiece in a direction from upstream to downstream, see arrow D). The rate at which the camera 36 detects, e.g. takes pictures, of the scanning laser line 32 can vary. In one example, the camera 36 detects, e.g. take pictures, of the scanning laser line 32 at a rate of approximately two hundred frames per second (or approximately one frame per 1.0 millimeter of travel by the second belt 22). Reference is made to U.S. Patent Application Publication No. 2017/0217044 for description of an example conventional scanning system. In certain examples, encoders 205 are integrated into the first belt 21 and/or the second belt 22 to generate pulses at fixed distances that correspond to the movement of the first belt 21 and/or second belt 22. The signals or data regarding the pulses from the encoders 205 can be transmitted to the computer controller 200 (FIG. 10) to further determine the shape, specifically length, of the workpiece.

Figure 6:
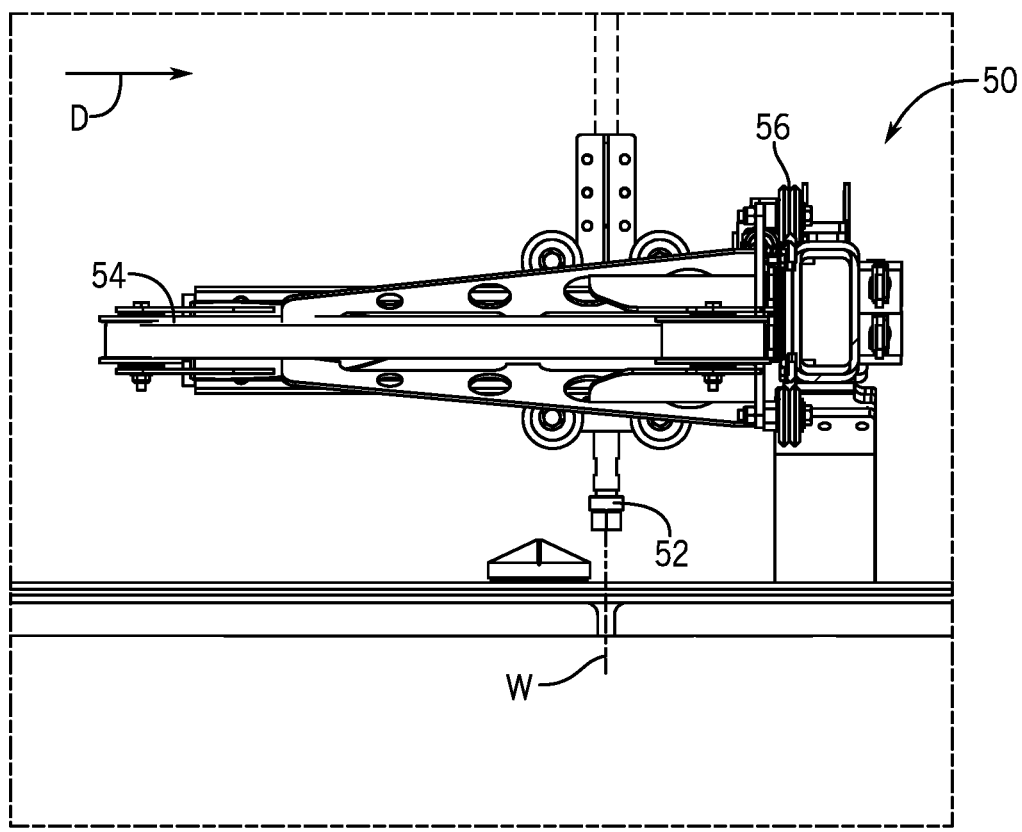
FIG. 6 is a side view of a cutting device that is misaligned with a calibration object.
Figure 7:
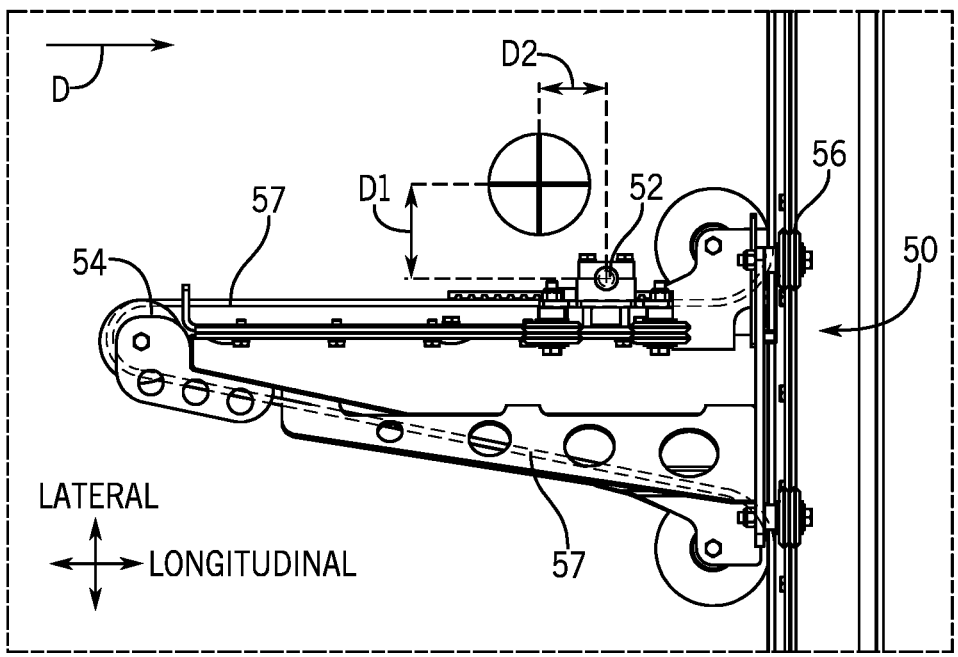
FIG. 7 is a top-down plan view like FIG. 6
Figure 8:
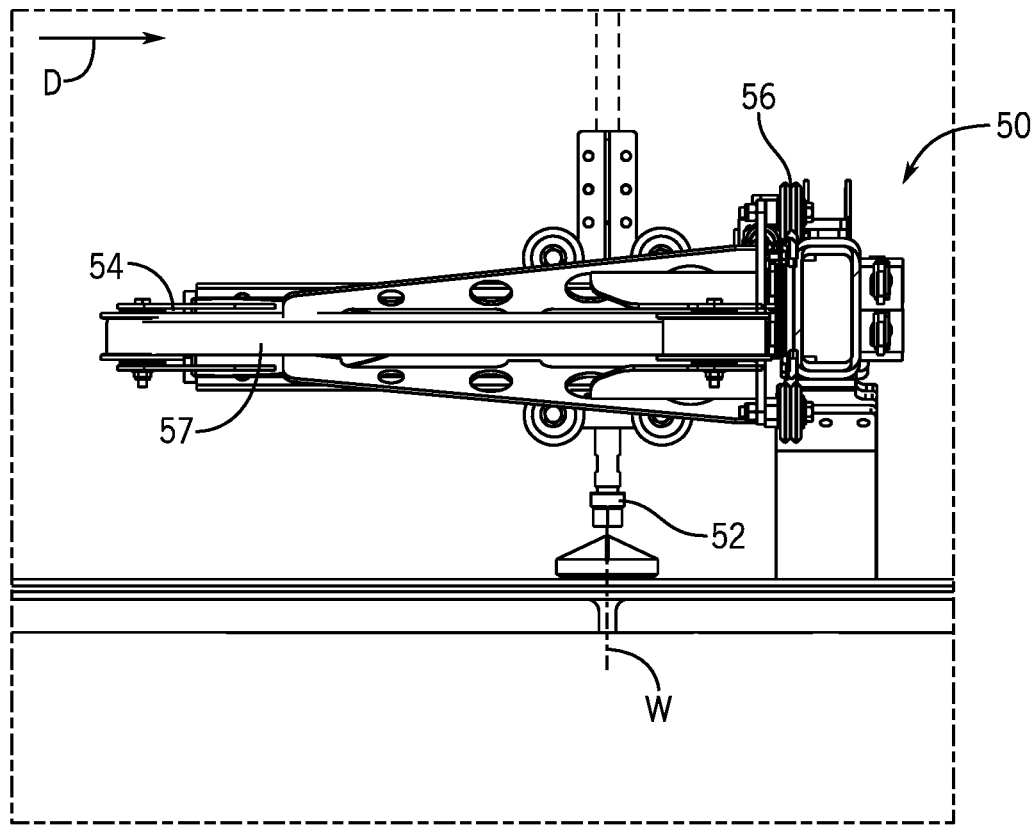
FIG. 8 is a side view of the cutting device in alignment with the calibration object.
Figure 9:
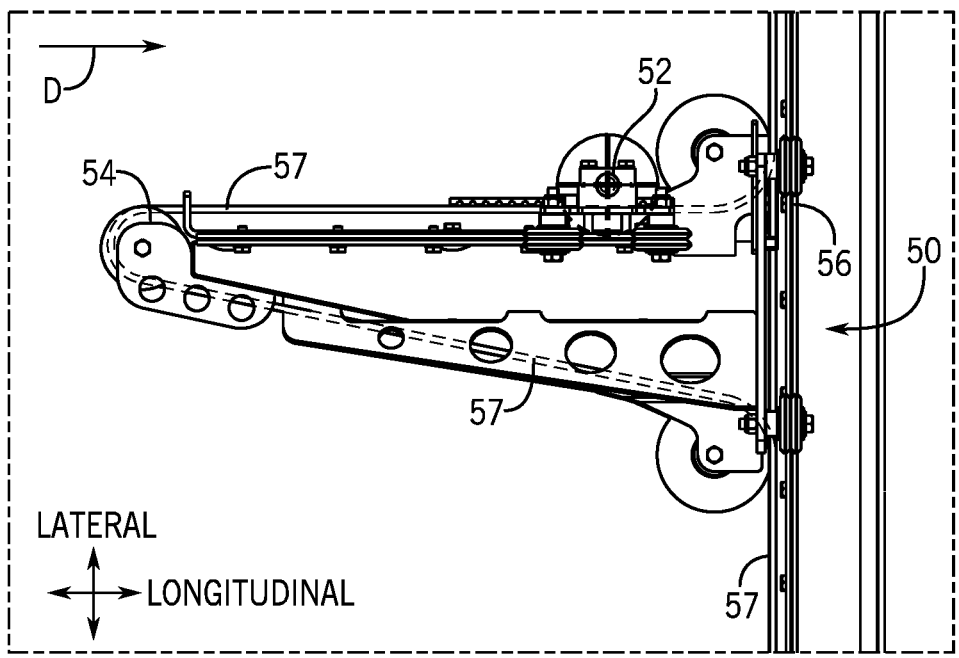
FIG. 9 is a top-down plan view like FIG. 8.

Referring now to FIGS. 6-9, after the workpiece is scanned by the scanning system 30, the workpiece is analyzed by the computer controller 200 as it is conveyed to the cutting section 16 (see FIG. 3) where it is cut into smaller pieces by cutting devices 52 (see FIGS. 6-9). The cutting device 52 is a component of a cutting assembly 50, and the cutting assembly 50 further includes carriages 54, to which the cutting devices 52 are mounted, that ride along tracks 56. The cutting assembly 50 also includes belts 57, servo motors (not shown), and gears (not shown) that operate to move the carriages 54 along the tracks 56 such that the cutting devices 52 are moved to cut the workpiece as it is conveyed past the cutting assembly 50. That is, the carriages 54 are moved along the tracks 56 such that the cutting devices 52 move to different positions within a cutting envelope (e.g. cutting zone) to thereby cut the workpiece. For example, FIGS. 6-7 depict the cutting device 52 in a first position and FIGS. 8-9 depict the cutting device 52 in a second position that is longitudinally and laterally offset from the first position.

The number of cutting assemblies 50 included at the cutting section 16 can vary. In the example depicted in FIG. 3, four cutting assemblies 50 are included at the cutting section 16. In this example, two of the cutting assemblies 50 are for cutting workpieces in a first longitudinal row of workpieces (note that the first longitudinal row of workpieces corresponds to workpieces aligned along a first infeed laser line 25 shown in FIG. 2) and the other two cutting assemblies 50 are for cutting workpieces in a second longitudinal row of workpieces (note that the second longitudinal row of workpieces corresponds to workpieces aligned along a second infeed laser line 25' shown in FIG. 2). In addition, the number of cutting device 52 in each cutting assembly 50 can vary (e.g. one cutting device 52 per cutting assembly 50, two cutting devices 52 per cutting assembly 50). The type of cutting devices 52 can also vary. In the example depicted in FIGS. 7-9, the cutting devices 52 are high-speed water jets that spray a water steam vertically downwardly to cut the workpiece. The water streams cut the workpieces and pass through the second belt 22 into a collection tank (not shown). Reference is made to U.S. Pat. No. 5,868,056 for description of conventional cutting assemblies.

The computer controller 200, shown in FIG. 10, is in communication with and controls the cutting assemblies 50 and the cutting devices 52 to cut the workpieces into smaller pieces. The size and shape of the smaller pieces are determined by a computing process performed by the computer controller 200 after or as the digital image of the workpiece is analyzed by the computer controller 200. In certain examples, the computer controller 200 compares the digital image of the workpiece to a stored program to determine the size, shape, width area, volume, and/or the like of the workpiece based on the digital image of the workpiece to thereby process (cut) the workpiece into smaller pieces, such as fillets and nuggets. That is, based on the stored program and the digital image of the workpiece, the computer controller 200 determines the optimum cuts necessary to produce the desired smaller pieces. As such, the computer controller 200 controls the cutting assembly 50 and the cutting device 52 to cut the workpiece into the smaller pieces as the workpiece is conveyed past the cutting assemblies 50 and the cutting devices 52.

FIG. 10 is a schematic diagram of an example computing system 190 of the machine 10. Various components are in communication with the computer controller 200 via wired or wireless communication links 210. The computer controller 200 includes a processor 201 and a memory 202. The computer controller 200 can be located anywhere in the computing system 190 and/or located remote from the computing system 190 and can communicate with various components of the food processing machine 10 via networks, peripheral interfaces, and wired and/or wireless links. Although FIG. 10 shows one computer controller 200, the computing system 190 can include more than one computer controller. Portions of the method disclosed herein below can be carried out by a single computer controller or by several separate computer controllers 200.

In some examples, the computer controller 200 may include a computing system that includes a processing system, storage system, software, and input/output (I/O) interfaces for communicating with peripheral devices. The systems may be implemented in hardware and/or software that carries out a programmed set of instructions. For example, the processing system loads and executes software from the storage system, such as software programmed with a cutting method, which directs the processing system to operate and control the cutting assemblies and cutting devices. The computing system may include one or more processors, which may be communicatively connected. The processing system can comprise a microprocessor, including a control unit and a processing unit, and other circuitry, such as semiconductor hardware logic, that retrieves and executes software from the storage system. The processing system can include one or many software modules comprising sets of computer-executable instructions for carrying out various functions as described herein.

The storage system can comprise any storage media readable by the processing system and capable of storing software. The storage system can be implemented as a single storage device or across multiple storage devices or subsystems. The storage system can include additional elements, such as a memory controller capable of communicating with the processing system.

The computer controller 200 communicates with one or more components of the control system via the I/O interfaces and a communication link, which can be a wired or wireless link. The computer controller 200 is capable of monitoring and controlling one or more operational characteristics of the control system and its various subsystems by sending and receiving control signals via the communication link.

The computer controller 200 functionally converts input signals, such as but not limited to encoder signals, inputs received via a user input device 70, or information from sensors, to output signals, such as but not limited component control signals, according to the computer-executable instructions. The input signals may be fed to several software modules within the computer controller 200 through branch signals. It should be appreciated that more than one input signal can be combined to provide an output signal, in which case the individual input signals may be input to the same software modules or may each be provided to an individual software module.

The provided description of the computer controller 200 is conceptual and should be interpreted generally, as those skilled in the art will recognize many ways to implement such a computer controller. These include implementation using a digital microprocessor that receives input signals or branch signals and performs a calculation using the input signals to produce the corresponding output signals or actuator control signals. Also, analog computers may be used, which comprise circuit elements arranged to produce the desired outputs. Furthermore, look-up tables containing predetermined or calibrated data points may be stored in any fashion to provide the desired output corresponding to a given input signal.

In order to ensure efficient and effective operation of the food processing machine 10, it is necessary for components of the food processing machine 10, such as the conveyor 20, the scanning system 30, and the cutting assembly 50 to be calibrated relative to the each other. Generally, the purpose of calibrating the food processing machine 10 is to match the position of the workpiece as scanned by the scanning system 30 to the position of the workpiece when in the cutting section 16 while accounting for the distance the workpiece has been conveyed to the cutting section 16. To accomplish this result, the machine 10 must "know" the exact distances (within 1 millimeter) between the scanning laser line 32 in the scanning section 14 and each cutting device 52 in the cutting section 16, the rotational position of the servo motors driving the cutting devices 52, and/or the actual starting position of the cutting devices 52. Failing to calibrate the machine 10 can result in workpieces being incorrectly cut. The calibration apparatuses, processes, and methods described herein below reduce the amount time the food processing machine must be taken out of service, increase the effectiveness of the calibration process, and reduce the number of calibration materials required.

Referring now to FIGS. 11-14, a calibration object 100, such as a calibration puck, of the present disclosure is depicted. The calibration object 100 used when calibrating the food processing machine 10 with the calibration processes and methods described herein. In the example depicted, the calibration object 100 has a cylindrical lower portion 101, a conical upper portion 102, and an axis 104 about which the lower portion 101 and the upper portion 102 are centered.

The lower portion 101 has a bottom surface 103, a perimetral edge 105, a height 117, and a first radius 106. A center bore 112 extends through the upper portion 102 and the along the axis 104. Attached to the bottom surface 103 is a flexible gasket 107 configured to vertically elevate the bottom surface 103 above the belts 21, 22. The gasket 107 facilitates and improves transfer of the calibration object 100 from the first belt 21 to the second belt 22 (see FIG. 4) and prevents the lower portion 101 from contacting or knocking against the leading edge of the second belt 22 which may cause the calibration object 100 to inadvertently move and thereby create errors in the calibration process. The gasket 107 can be made of any suitable elastic material.

The upper portion 102 has an outer surface 114 with lines 116 for aligning the calibration object 100 with the infeed laser lines 25 (FIG. 2). In the example depicted, the lines 116 are channels or grooves recessed into the outer surface 114. The upper portion 102 also includes a target, such as a pinhole 115 that extends along the axis 104 and is in communication with the center bore 112 of the lower portion 101. In this example, the diameter of the pinhole 115 is 1.6 millimeter. During calibration, water streams pass through the pinhole 115 and the center bore 112 (described further herein). The size of the pinhole 115, the center bore 112, and the lines 116 can vary. In one non-limiting example, the pinhole 115 has a diameter of 0.063 inches, the lines 116 are recessed grooves having a width of 0.063 inches, the radius 106 is 3.25 inches, and a height 117 is 1.22 inches. In another example, the target is indicia on the outer surface 114.

The calibration object 100 can be made of any suitable material, and the calibration object 100 is preferably a food-safe material capable of withstanding the pressure of the water stream from the cutting devices 52, such as stainless steel or high-density plastic. The size and shape of the calibration object 100, the lower portion 101, and/or the upper portion 102 can vary. For example, the upper portion 102 can be flat. In other examples, the upper portion 102 is excluded or eliminated. The portions 101, 102 of the calibration object 100 can be integrally formed, or the portions 101, 102 can be joined or adhered together. In one example, the portions 101, 102 are adhered together by adhesives and a gasket, such as an O-ring, is positioned between the portions 101, 102.

Figure 15:
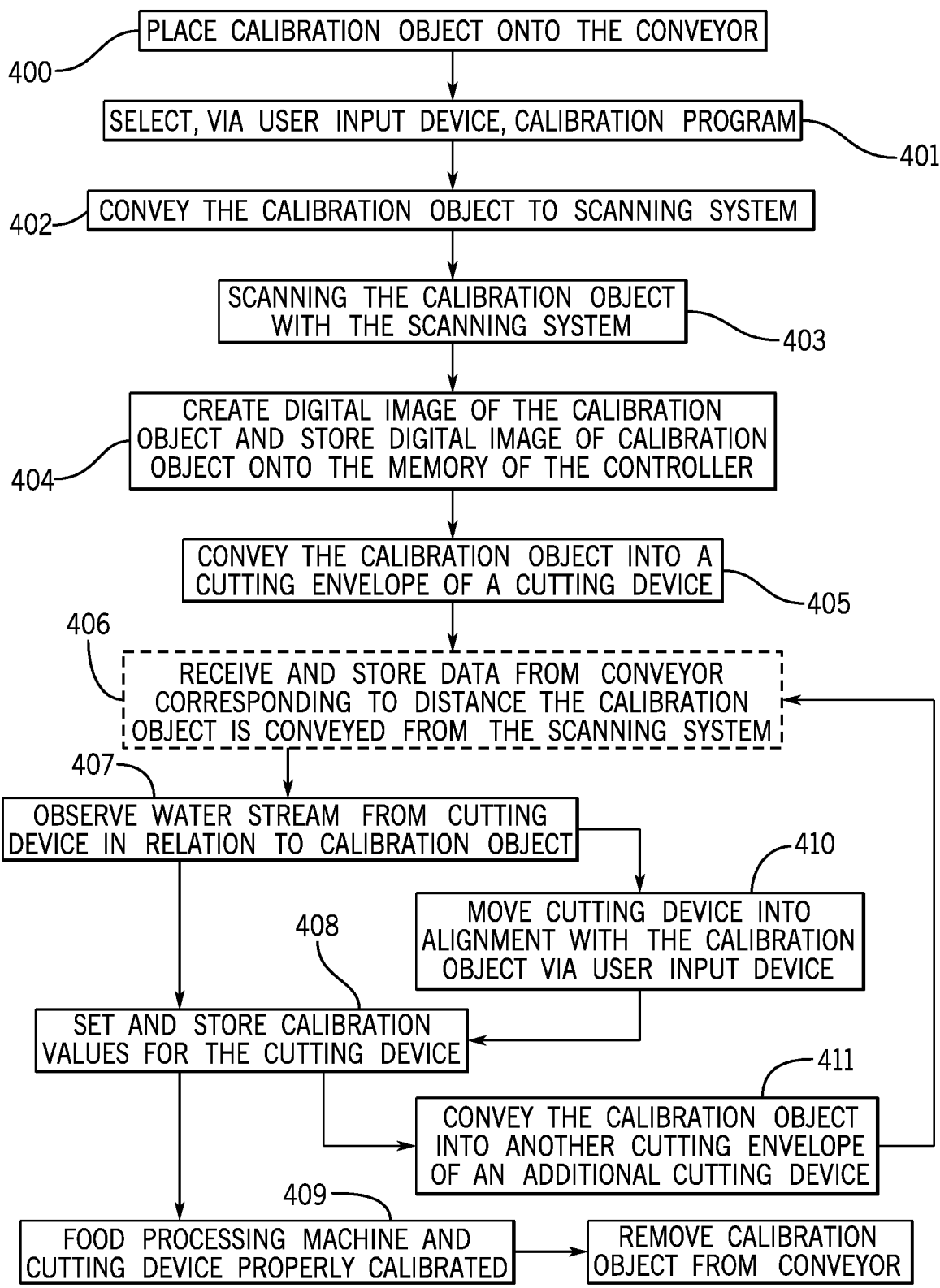
FIG. 15 is an example flowchart of a calibration method using the calibration object.

The calibration object 100 is used when calibrating the food processing machine 10, and an example calibration system and method are described in the flowchart depicted in FIG. 15. At step 400, the calibration method begins by placing the calibration object 100 (FIG. 11-14) onto the first belt 21 such that at least one of the lines 116 of the calibration object 100 is aligned with the infeed laser lines 25 (FIG. 2). The technician, via a user input device 70 (FIG. 10), selects a calibration software/program to start the calibration process (see step 401). At step 402, the first belt 21 of the conveyor 20 conveys the calibration object 100 to the scanning section 14 (FIG. 3). The calibration object 100 is scanned by the scanning system 30 (at step 403) and a digital image of the calibration object 100 including the target (e.g. pinhole 115) is created by the computer controller 200 (FIG. 10) based on signals received from the scanning system 30 (at step 404). Accordingly, the computer controller 200 stores the size/shape of the calibration object 100 onto the memory 202 and thereby "knows" the exact location of the infeed laser lines 25 as the pinhole 115 of the calibration object 100 is aligned with the infeed laser line 25. Note that the calibration object 100 may be placed onto the first belt 21 without being aligned to the infeed laser line 25 when alignment with infeed laser line 25 is not necessary or if the technician does not desire to calibrate the infeed laser line(s) 25.

At step 405, the calibration object 100 is further conveyed on the second belt 22 of conveyor 20 to the cutting section 16 (FIG. 3), and the calibration object 100 is stopped inside the cutting envelope of a first cutting device 52. Optionally, at step 406, the computer controller 200 receives and stores data from the conveyor 20 and/or the encoders (not shown) that corresponds to the position or the distance the calibration object 100 has been conveyed for the scanning system 30 into the cutting section 16 to thereby determine calibration values such as alignment values and delay measurement values.

Figure 16:
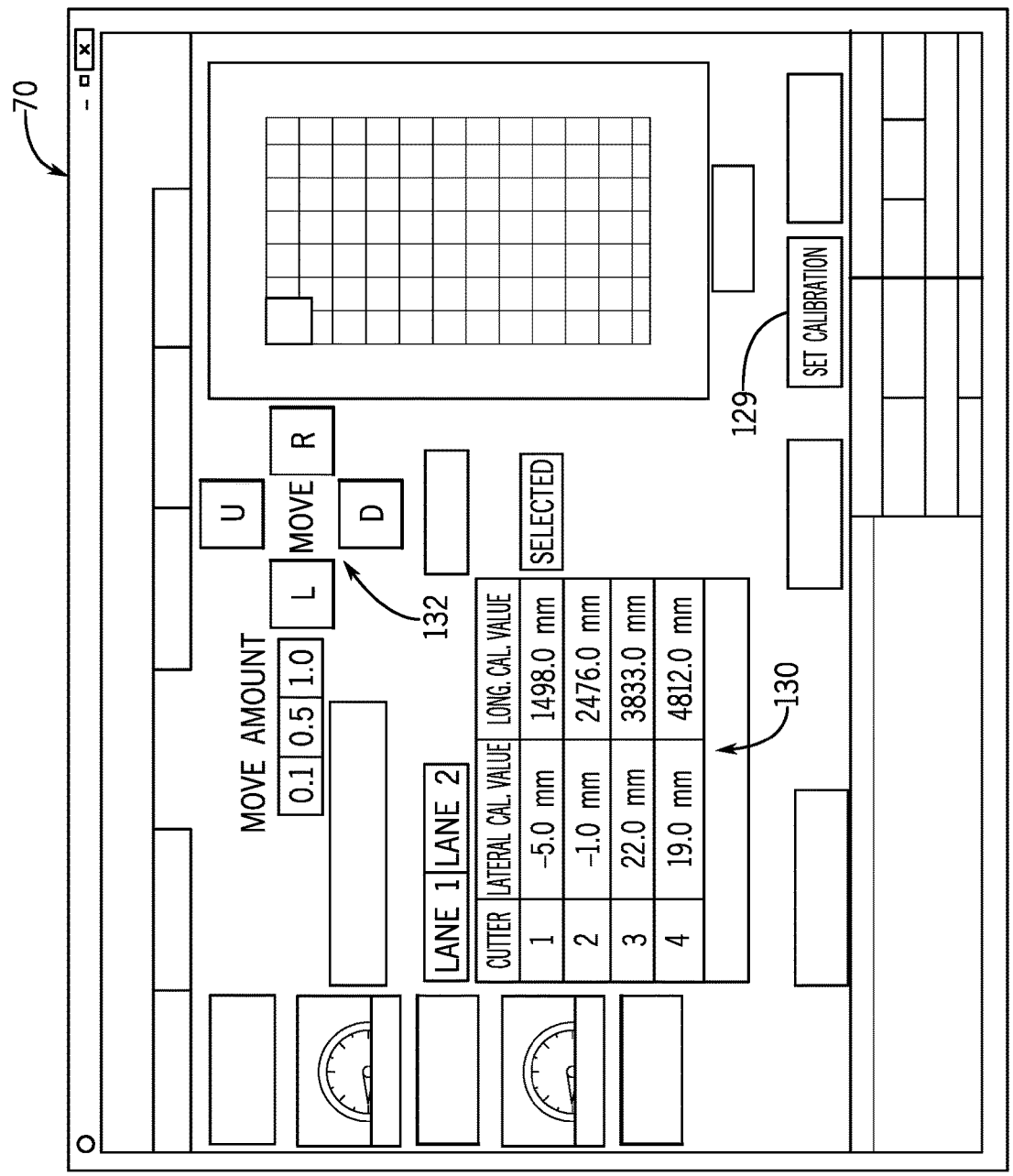
FIG. 16 is a visual output of a user input device

Next, at step 407, the water stream dispensed from the cutting device 52 (FIG. 6) (note in this example the cutting device 52 is a water jet cutting device) is then observed by the technician. If the water stream passes through the pinhole 115 and the center bore 112 of the calibration object 100 (FIGS. 11-14), the cutting device 52 is aligned and no adjustment to the position of the cutting device 52 is necessary. At the same time, the user input device 70 displays calibration values corresponding to the position of the cutting device 52 relative to a datum and/or the calibration object 100. Because the cutting device 52 is aligned with the calibration object 100 the calibration values do not need to be changed and the technician could either instruct the computer controller 200 to skip to the next cutting device or re-store the same (previously stored) calibration values on the memory 202 by selecting "Set Calibration" image/icon 129 (see FIG. 16) via the user input device 70 (see step 408). As such, the calibration method is complete and the food processing machine 10 is properly calibrated (see step 409).

However, if the water stream does not pass through the pinhole 115 and the center bore 112 of the calibration object 100 (e.g. the water stream deflects off of the outer surface 114), the cutting device 52 is not properly aligned. FIGS. 6-7 depict an example cutting device 52 that is not aligned with the calibration object 100, and as shown in FIG. 6, the water stream (dashed line W) does not pass through the pinhole 115 and the center bore 112 (see FIGS. 11-14) of the calibration object 100. In this specific example, the cutting device 52 is both longitudinally (in the longitudinal direction) and laterally (in the lateral direction) offset from or misaligned with the calibration object 100. Accordingly, at step 410, the operator controls the longitudinal and/or the lateral movement of the cutting device 52 by selecting or inputting control inputs or commands into the user input device 70. For example, the technician may press mechanical buttons of the user input device 70 or tap images/icons on a touchscreen display of the user input device 70 to thereby laterally and/or longitudinally move the cutting device 52 in a y-direction (lateral direction) and/or an x-direction (longitudinal direction) (see FIG. 16 for "Move L R U D" images/icons inputs 132). As the technician moves the cutting device 52 via the user input device 70, the computer controller 200 tracks the position and/or the movement of the cutting device 52. The manner in which the computer controller 200 tracks the position and/or the movement of the cutting device 52 can vary, such as monitoring the activation or positioning of the belts 57, servo motors, gears, carriages 54, or tracks 56 of the cutting assembly 50 or sensing or detecting movement of the cutting device 52 with sensors/detectors.

FIGS. 8-9 depicts the cutting device 52 moved into alignment with the calibration object 100 after the cutting device 52 shown in FIGS. 6-7 is moved in the y-direction (lateral direction) distance D1 and the in the x-direction (longitudinal direction) distance D2. As the technician selects inputs 132 and moves the cutting device 52, the calibration values of the calibration object 100, which are visually displayed at box 130 on FIG. 16, change. Once the technician observes that the water stream passes through calibration object 100, the technician stops moving the cutting device 52 and stores, by selecting "Set Calibration" image/icon 129 via the user input device 70 (FIG. 16), the calibration values (see box 130 on FIG. 16) into the memory 202 of the computer controller 200 for the cutting device 52 (see step 408). As such, the calibration method is complete and the food processing machine 10 is properly calibrated (see step 409).

Optionally, in example food processing machines 10 with more than one cutting device 52, the calibration object 100 is further conveyed on the second belt 22 of conveyor 20 to the cutting envelope of a second cutting device (see step 411). Accordingly, the other cutting devices 52 can be aligned and/or calibrated by repeating any of the steps 406-410 as described above until all the cutting devices 52 are calibrated. Still further, cutting devices 52 for cutting different parallel longitudinal rows of workpieces can be calibrated using the same steps as described above.

Once all the calibration values are determined, the computer controller 200 uses the calibration values, the digital image of the workpiece, and/or the distance the belts 21, 22 of the conveyor 20 have moved to properly cut and/or portion the workpiece into the desired smaller pieces. That is, the computer controller 200 is configured to calibrate position or movement of the cutting device 52 relative to the workpiece based on the digital image of the workpiece (and/or the position of target) and the calibration values stored in or on the memory 202 to thereafter accurately cut the workpiece. The calibration system and method of the present disclosure is less time consuming and less costly than conventional calibration systems (e.g. in the calibration system of the present disclosure, a single calibration object can be conveyed through the machine to calibrate each cutting device located in a row in sequence and in both the y-direction and the x-direction at the same time thereby saving time in comparison to some conventional calibration systems that require multiple fake workpieces to be to conveyed several times through the machine and following additional steps for working with the fake workpieces) (e.g. the single calibration object is used for multiple cutting devices and can be reused at a later date to re-calibrate the machine).

The present inventors have found that the sloped, conical outer surface 114 of the calibration object 100 (see FIGS. 11-14) is advantageous as it deflects or redirects the water stream from the cutting device 52 (see FIG. 6) radially outwardly from outer surface 114 and thereby the operator can visually see that the water stream is not aligned with the pinhole 115. Accordingly, the operator can easily align the cutting device 52 with the pinhole 115 of the calibration object 100 by observing the redirection of the water stream. Furthermore, the lines 116 that are recessed or outwardly project from the outer surface 114 of the calibration object 100 may also deflect the water stream and thereby guide or provide additional visual cues to the operator as the cutting device 52 is aligned with the calibration object 100. For example, the lines 116 may be aligned with the infeed laser lines 25, and by extension, the x-direction and y-direction. Once the water stream is observed to be contacting one of the lines 116, the user "knows" that the cutting device 52 aligned with one of the directions and need only be moved in the other direction to thereby align the cutting device 52 with the calibration object 100. In certain examples, the cutting device 52 has a laser light emitter (not shown) which aids in aligning the cutting device 52 with a calibration object 100 (described herein).

As described above, the technician manually enters inputs into the user input device 70 to move the cutter devices 52 via the computer controller 200. However, the present inventors have also recognized that the cutter devices 52 could be manually moved into alignment with the calibration object 100 by physically engaging and moving the cutting devices 52. Furthermore, the inventors have also recognized that the cutting devices 52 could be moved automatically into alignment with the calibration object 100 based on feedback or signals from sensors in the food processing machine 10 and/or on or in the calibration object 100. In one specific example, the calibration object 100 include one or more sensors and/or emitters for detecting and/or transmitting the position of water stream from a cutting device 52 striking the outer surface of the calibration object 100 such that the computer controller 200 automatically moves or guides each cutting device 52 into alignment with the calibration object 100. In another specific example, pressure sensors on the bottom surface of the calibration object 100 and a wireless transmitter in the calibration object 100 could communicate with the computer controller 200 and/or the food processing machine 10 corresponding to the pressure sensed by the pressure sensors when the water stream from the cutting device 52 contacts the calibration object. In other example, proximity sensors are on or in the calibration object 100.

In still another specific example, a water detector detects the presence of water from the water stream on the surface of the calibration object 100. In one example, pressure sensors are arranged in a triangular or rectangular pattern along the bottom of the calibration object. In another example, water sensors in the food processing machine 10 detect water particles or mist that deflect off of the calibration object 100. In another example, an embedded microcontroller in the calibration object 100 communicates with the food processing machine 10 to guide the cutting device 52 into alignment with the calibration object 100. In another example, the calibration object 100 may include a camera, motion detector, and/or distance measurer (e.g. proximity sensor) that detects the position of the cutting device 52 without the use of water. The idea extends to any instance of moving cutting device(s) to one or more specific points on the calibration object to establish the positional relationship between components of the scanner system 30, the scanning laser line 32, or the cutting device(s) 52.

In certain examples, the calibration object 100 incorporates multiple design features to allow the scanning system 30 to accurately determine the location of the center bore 112. The center bore 112 of the calibration object 100 cannot be detected directly by the scanning system 30, since the scanning system 30 does not necessarily have sufficient resolution. Instead, the scanning system 30 infers the location of the center bore 112 by virtue of the fact that the center bore 112 is located both in the center of mass of the calibration object 100, as well as 'peak point' of the virtual cone created by the sloped outer surfaces 114 of the upper portion 102. That is, the outer surfaces 114 of the calibration object 100 are sloped at a shallow angle, allowing all outer surfaces 114 of the calibration object 100 to be seen from both the 'front view' and 'rear view' by the scanning system 30. Furthermore, the exact position of the perimetral edge 105 is difficult to measure because the scanning system 30 has difficulty seeing a vertical edge. However, the conical shape of the outer surface 114 allows the controller 200 and/or the software to determine the exact center bore 112 of the calibration object 100 without relying on the position of the outer edge 114 of the calibration object 100.

In another example, the calibration object 100 is a piece of cardboard with lines marked thereon. The lines would be could denote separate "bullseye" positions for each cutting device 52, and the scanner system 30 could detect and record the position of the lines. The controller 200 would then move or jog each cutting device 52 over the "bullseye" positions, respectively. In a specific example, the controller 200 may guide the cutting devices 52 to a position in which the water stream from the cutting device 52 is aligned with a corner or four corners of a square formed from the lines.

In another example, a dual-lane food processing machine (e.g. food processing machines for conveying and processing two parallel longitudinal rows of workpieces) could calibrate both lanes at the same time by placing one calibration object in each lane, adjacent to each other on the belt. The calibration of the cutting devices or cutters would be done by alternating lanes, calibration Lane 1 Cutter 1, followed by Lane 2 Cutter 1, Lane 1 Cutter 2, Lane 2 Cutter 2, etc. In this way all cutters or cutting devices on the machine could be calibrated by moving calibration objects through the entire machine in parallel, rather than in sequence, thereby saving time.

In another example, a calibration object 100 could be constructed with two (or more) widely spaced holes to additionally calibrate the 'skew angle' of the food processing machine. 'Skew Angle' is the difference in angle between the scanning laser line 32 (see FIG. 5) and the tracks 56 (see FIG. 6). The scanning laser line 32 and the tracks 56 of the cutting assembly 50 are ideally parallel to each other and both perpendicular to the direction of travel (see arrow D) of the conveyor 20. However, if they are not parallel, the difference in their orientation is measured with a 'skew angle'. A calibration object 100 could be constructed with two (or more) holes spaced a significant distance in relation to the width of the belt (for example one-fifth to four-fifths the width of the belt) to provide calibration of any 'skew angle'. Such a calibration target could be made out of two of the existing calibration objects, separated by a bar 200.0 mm in length as a non-limiting example. Each cutting device 52 could be moved to the center of each of the two holes in the calibration object 100, and the controller and/or software could measure the difference in position and orientation between the two holes as detected by the scanner system and cutting device to measure the skew angle.

Figure 17:
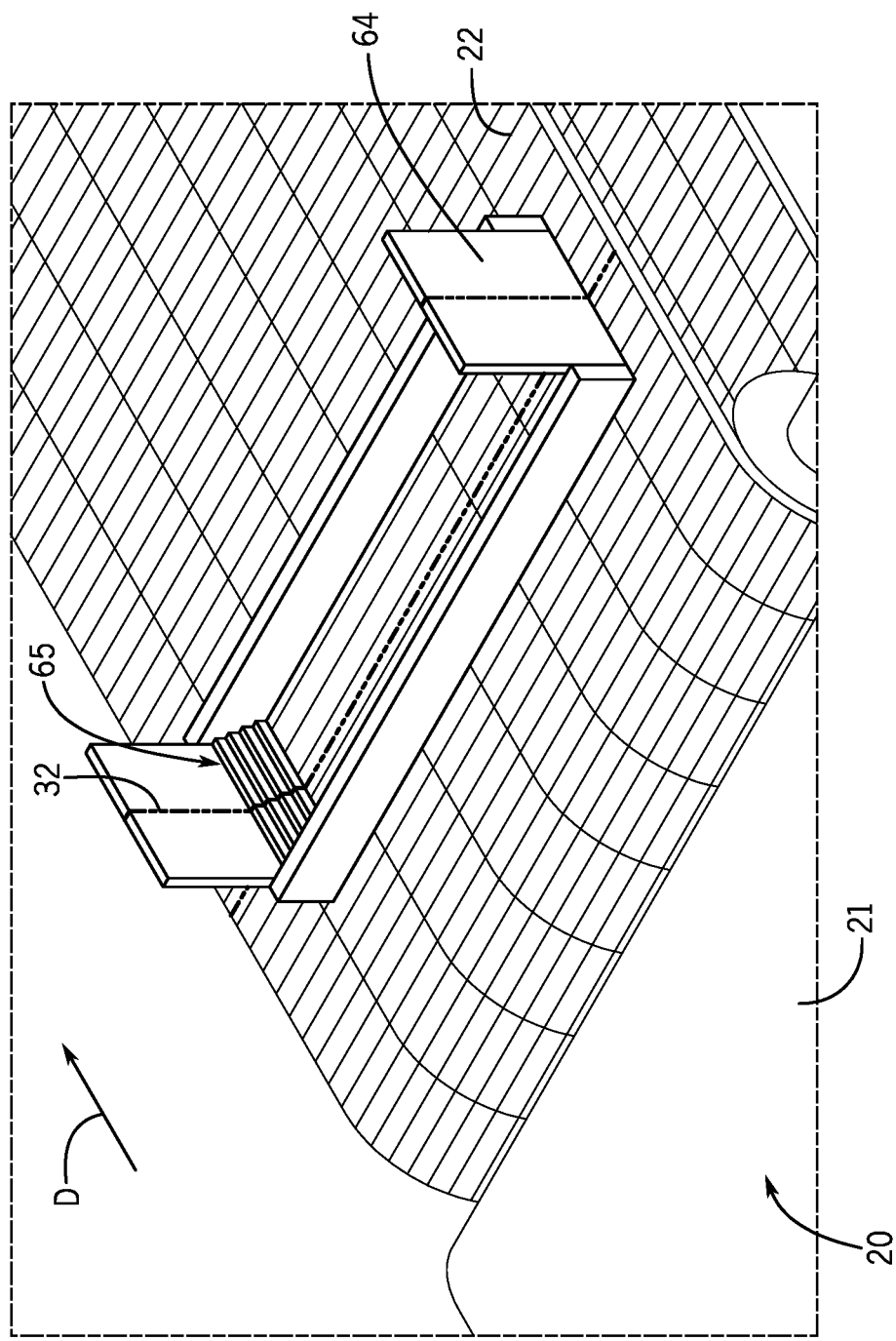
FIG. 17 is a view of a detector calibration target on the conveyor.

Referring to FIG. 17, the camera 36 (see FIG. 4) may also need to be calibrated. To calibrate the camera 36, a detector calibration target 64 is placed on the second belt 22 at the location of the scanning laser line 32. The side walls of the detector calibration target 64 are stepped (see steps 65), and the camera 36 detects these steps 65 (visual representation of the steps 65 are shown on FIG. 8 part number 66). The controller 200 (FIG. 10) determines the relationship between the images taken by the camera 36 and the real-world shape of the detector calibration target 64. Once camera calibration is complete, the digital image of the detector calibration target 64, the digital image of the workpieces (as described above, and the position of the food product on the first belt 21 can be determined.

In certain examples, a calibration system for a food processing machine has a conveyor for conveying a workpiece, scanning system for scanning the workpiece and creating a digital image of the workpiece, and a cutting device downstream from the scanning system for cutting the workpiece. A calibration object is conveyed through the food processing machine by the conveyor and scanned by the scanning system. A controller, with a memory, is in communication with the cutting device and the conveyor such that the controller can track position and/or movement of the cutting device as the cutting device is moved into alignment with the calibration object and further store calibration values on the memory corresponding to the movement of the cutting device when aligned with the calibration object. The controller is configured to calibrate movement of the cutting device relative to the workpiece based on the digital image of the workpiece and the calibration values to thereafter accurately cut the workpiece.

In certain examples, a method for calibrating a food processing machine having a conveyor for conveying a workpiece, a scanning system for scanning the workpiece and creating a digital image of the workpiece, and a cutting device downstream from the scanning system for cutting the workpiece includes conveying, with the conveyor, a calibration object to the scanning system. Scanning the calibration object to create a digital image of the calibration object, and further conveying, with the conveyor, the calibration object to the cutting device. Moving the cutting device into alignment with the calibration object, tracking, with a controller having a memory, position or movement of the cutting device into alignment with the cutting device (or position of the cutting device when aligned with the calibration object), and storing, onto the memory, calibration values corresponding to movement of the cutting device into alignment with the calibration object. The method further includes calibrating, with the controller, operational movement of the cutting device relative to the workpiece based on the digital image of the workpiece and the calibration values stored on the memory to thereafter accurately cut the workpiece.

In certain examples, the method for a first cutting device and a second cutting device includes further conveying, with the conveyor, the calibration object to the second cutting device. Moving the second cutting device into alignment with the calibration object, tracking, with the controller, position or movement of the second cutting device into alignment with the second cutting device, and storing, onto the memory, secondary calibration values corresponding to movement of the second cutting device into alignment with the calibration object. The secondary calibration values for the second cutting device are independent from the calibration values stored for the first cutting device. The method further comprises calibrating, with the controller, operational movement of the second cutting device relative to the workpiece based on the digital image of the workpiece and the secondary calibration values stored on the memory such that the second cutting device accurately cuts the workpiece after the first cutting device cuts the workpiece.

In the present description, certain terms have been used for brevity, clarity, and understanding. No unnecessary limitations are to be inferred therefrom beyond the requirement of the prior art because such terms are used for descriptive purposes only and are intended to be broadly construed. The different apparatuses, systems, and methods described herein may be used alone or in combination with other apparatuses, systems, and methods. Various equivalents, alternatives, and modifications are possible within the scope of the appended claims.

What is claimed is:

1. A calibration system for a food processing machine comprising:
    a conveyor configured to convey a workpiece;
    a scanning system configured to scan the workpiece and create a digital image of the workpiece;
    a cutting assembly downstream from the scanning system that has a cutting device configured to cut the workpiece based on the digital image of the workpiece;
    a calibration object that is conveyed by the conveyor and scanned by the scanning system prior to cutting the workpiece, wherein the scanning system creates a digital image of the calibration object; and
    a controller in communication with the cutting assembly, the scanning system, and the conveyor, the controller configured to: determine that the cutting device is in alignment with the calibration object based on the digital image of the calibration object and signals from the conveyor and the cutting assembly, store calibration values based on the alignment of the cutting device with the calibration object, and thereafter move the cutting device based on the calibration values in order to cut the workpiece.

2. The calibration system according to claim 1, wherein the controller is configured to move the cutting device into alignment with the calibration object.

3. The calibration system according to claim 1, further comprising a user input device for receiving a user input and in communication with the controller, and wherein the controller is further configured to move the cutting device into alignment with the calibration object based on the user input.

4. The calibration system according to claim 1, wherein the calibration object has a target, and wherein the cutting device is aligned with the target.

5. The calibration system according to claim 4, wherein the target is a pinhole that extends through the calibration object, and wherein the cutting device dispenses a water stream that passes through the pinhole when the cutting device is aligned with the target.

6. The calibration system according to claim 5, wherein the calibration object has a line that extends from the target.

7. The calibration system according to claim 4, wherein the calibration object has a sloped upper portion that converges to the target.

8. The calibration system according to claim 6, wherein the calibration object has a flexible gasket that contacts the conveyor.

9. The calibration system according to claim 1, wherein the controller is configured to analyze the digital image of the workpiece and determine cuts along which the cutting device cuts the workpiece, and wherein the controller moves the cutting device based on the calibration values and the cuts to thereby cut the workpiece.

10. The calibration system according to claim 1, wherein the calibration object has a plurality of sensors, and wherein the controller is in communication with the plurality of sensors; and
    wherein the determining that the cutting device is in alignment with the calibration object includes receiving signals from the plurality of sensors.

11. The calibration system according to claim 10, wherein the sensors of the plurality of sensors are pressure sensors or proximity sensors.

12. A method for calibrating a food processing machine having a conveyor for conveying a workpiece, a scanning system for scanning the workpiece and creating a digital image of the workpiece, and a cutting device downstream from the scanning system for cutting the workpiece, the method comprising:
    conveying, with the conveyor, a calibration object to the scanning system;
    scanning the calibration object to create a digital image of the calibration object;
    further conveying, with the conveyor, the calibration object to the cutting device;
    determining, with a controller, that the cutting device is in alignment with the calibration object;
    storing calibration values on the controller based on the alignment of the cutting device with the calibration object;
    conveying a workpiece to a scanning system that scans the workpiece and creates a digital image of the workpiece;
    further conveying the workpiece to the cutting device; and
    moving, with the controller, the cutting device based on the on the digital image of the workpiece and the calibration values in order to cut the workpiece.

13. The method according to claim 12, further comprising moving, with the controller, the cutting device into alignment with the calibration object.

14. The method according to claim 13, further comprising:
receiving a user input, with a user input device in communication with the controller, that corresponds to desired movement of the cutting device into alignment with the calibration object; and
moving, with the controller, the cutting device into alignment with the calibration object based on the user input.

15. The method according to claim 12, wherein the calibration object has a target, and further comprising:
moving, with the controller, the cutting device into alignment with the target of the calibration object.

16. The method according to claim 15, wherein the target is a pinhole that extends through the calibration object, and the method further comprising:
dispensing, with the cutting device, a water stream, wherein when the cutting device is misaligned with the calibration device, the water stream deflects off the calibration object, and wherein when the cutting device is aligned with the calibration object, the water stream passes through the pinhole.

17. The method according to claim 14, wherein the cutting device is a first cutting device and wherein the food processing machine has a second cutting device; and further comprising:
further conveying, with the conveyor, the calibration object to the second cutting device;
determining, with the controller, that the second cutting device is in alignment with the calibration object;
storing secondary calibration values—on the controller based on the alignment of the second cutting device with the calibration object; and
moving, with the controller, the second cutting device based on the secondary calibration values in order to cut the workpiece.

18. The method according to claim 17, further comprising:
receiving a secondary user input, with the user input device, that corresponds to the desired movement of the second cutting device into alignment—with the calibration object; and
moving, with the controller, the second cutting device into alignment with the calibration object based on the secondary user input.

19. The method according to claim 14, wherein the calibration object has a plurality of sensors, and the method further comprising:
receiving signals, with the controller, from the plurality of sensors; and
wherein the determining that the cutting device is in the alignment with the calibration object includes incorporating the signals from the plurality of sensors.

20. The method according to claim 19, wherein the sensors are pressure sensors or proximity sensors.

21. A calibration system for a food processing machine comprising:
a conveyor configured to convey a workpiece;
a scanning system configured to scan the workpiece and create a digital image of the workpiece;
a cutting device downstream from the scanning system that is configured to cut the workpiece based on the digital image;
a calibration object that is conveyed by the conveyor prior to cutting the workpiece; and
a controller in communication with the cutting device, the scanning system, and the conveyor, the controller configured to: determine that the cutting device is in alignment with the calibration object, store calibration values based on the alignment of the cutting device with the calibration object, and move the cutting device based on the calibration values in order to cut the workpiece.

* * * * *